US010533256B2

(12) United States Patent
Rankin et al.

(10) Patent No.: US 10,533,256 B2
(45) Date of Patent: Jan. 14, 2020

(54) HYDROPHOBIC COATINGS FOR METALS INCORPORATING ANODIC AND RARE-EARTH OXIDES AND METHODS OF APPLYING SAME

(71) Applicant: GKN Aerospace Transparency Systems, Inc., Garden Grove, CA (US)

(72) Inventors: Christopher Rankin, Orange, CA (US); Marlowe Moncur, Irvine, CA (US)

(73) Assignee: GKN Aerospace Transparency Systems, Inc., Garden Grove, CA (US)

( * ) Notice: Subject to any disclaimer, the term of this patent is extended or adjusted under 35 U.S.C. 154(b) by 0 days.

(21) Appl. No.: 15/728,365

(22) Filed: Oct. 9, 2017

(65) Prior Publication Data

US 2019/0106794 A1    Apr. 11, 2019

(51) Int. Cl.
| | | |
|---|---|---|
| C25D 11/18 | (2006.01) | |
| C25D 11/24 | (2006.01) | |
| C25D 13/02 | (2006.01) | |
| C23C 28/04 | (2006.01) | |
| C25D 9/06 | (2006.01) | |
| C25D 9/08 | (2006.01) | |
| C09D 1/00 | (2006.01) | |
| C01F 7/02 | (2006.01) | |

(Continued)

(52) U.S. Cl.
CPC .............. *C23C 28/04* (2013.01); *B82Y 30/00* (2013.01); *C01F 7/021* (2013.01); *C09D 1/00* (2013.01); *C09D 7/43* (2018.01); *C09D 7/65* (2018.01); *C09D 13/00* (2013.01); *C23C 24/082* (2013.01); *C25D 9/06* (2013.01); *C25D 9/08* (2013.01); *C25D 11/18* (2013.01); *C25D 11/24* (2013.01); *C25D 11/26* (2013.01); *C25D 11/34* (2013.01); *C25D 13/02* (2013.01)

(58) Field of Classification Search
CPC .......... C25D 11/18; C25D 11/24; C25D 13/02
See application file for complete search history.

(56) References Cited

U.S. PATENT DOCUMENTS

| | | |
|---|---|---|
| 2005/0115840 A1 | 6/2005 | Dolan |
| 2006/0147634 A1 | 7/2006 | Strauss |

(Continued)

FOREIGN PATENT DOCUMENTS

| | | | | |
|---|---|---|---|---|
| GB | 2541756 A | * | 3/2017 | ............... B32B 5/18 |
| WO | WO2015069532 A2 | | 5/2015 | |

OTHER PUBLICATIONS

D. Quéré, "Non-sticking drops," Reports on Progress in Physics, vol. 68, No. 11, pp. 2495-2532, Nov. 2005.

(Continued)

*Primary Examiner* — Brian W Cohen
(74) *Attorney, Agent, or Firm* — Sheppard, Mullin, Richter & Hampton LLP

(57) ABSTRACT

A hydrophobic coating and a method for applying such a coating to a surface of a metallic substrate. The method can include anodizing a nanoporous layer of anodic metal oxide on the surface; cathodizing yttrium oxide nanoparticles onto the surface; applying a hydrophobic ceramic coating composition to the surface by an application method selected from the group consisting of: flowing, dipping, and spraying; and heating the coated surface at a cure temperature from about 150° C. to about 300° C. for at least 2 hours.

16 Claims, 4 Drawing Sheets

(51) Int. Cl.
| | |
|---|---|
| C09D 7/43 | (2018.01) |
| C09D 7/65 | (2018.01) |
| C23C 24/08 | (2006.01) |
| C09D 13/00 | (2006.01) |
| B82Y 30/00 | (2011.01) |
| C25D 11/26 | (2006.01) |
| C25D 11/34 | (2006.01) |

(56) References Cited

U.S. PATENT DOCUMENTS

| | | | |
|---|---|---|---|
| 2013/0251942 A1 | 9/2013 | Azimi et al. | |
| 2014/0318974 A1* | 10/2014 | Curran | C25D 11/02 205/50 |
| 2015/0259818 A1* | 9/2015 | Binder | C25D 11/24 205/50 |

OTHER PUBLICATIONS

L. Bocquet and E. Lauga, "A smooth future?" Nature Materials, vol. 10, No. 5, pp. 334-337, May 2011.

D. Quéré, "Wetting and roughness," Annual Review of Materials Research, vol. 38, pp. 71-99, Jul. 2008.

K. Liu et al., "Metallic surfaces with special wettability," Nanoscale, vol. 3, No. 3, pp. 825-838, Mar. 2011.

G. Azimi, et al., "Hydrophobicity of rare-earth oxide ceramics," Nature Materials, vol. 12, No. 4, pp. 315-320, Apr. 2013.

F. Millot, et al., "A new method for the study of chemical diffusion in oxides with application to cerium oxide $CeO_{2-x}$," Journal of Physics and Chemistry of Solids, vol. 46, No. 7, pp. 797-801, 1985.

S. Yabe et al., "Cerium oxide for sunscreen cosmetics," Journal of Solid State Chemistry, vol. 171, No. 1-2, pp. 7-11, 2003.

Michael Veith, et al., "Low temperature synthesis of nanocrystalline $Y_3Al_5O_{12}$ (YAG) and Ce-doped $Y_3Al_5O_{12}$ via different sol-gel methods", J. Mater. Chem., 1999, 3069-3079.

CJ Shih, et al., "Synthesis and crystal kinetics of cerium oxide nanocrystallites prepared by co-precipitation process", Materials Chemistry and Physics, 2010.

Eddy, et al., "Progress in Nano-Engineered Anodic Aluminum Oxide Membrane Development", Materials 2011, 4(3), 487-526; doi:10.3390/ma4030487.

Hu et al., "Nanomechanical characterization of porous anodic aluminumoxide films by nanoindentation", Thin Solid Films 598:131-140, Jan. 2016.

Junping Zhang et al., "Controllable fabrication of porous alumina templates for nanostructures synthesis", Materials Chemistry and Physics, Jul. 2010.

\* cited by examiner

HYDROPHOBIC COATINGS FOR METALS INCORPORATING ANODIC AND RARE-EARTH OXIDES AND METHODS OF APPLYING SAME

FIELD OF THE INVENTION

This invention relates generally to hydrophobic coatings and, more particularly, to a hydrophobic coating comprising anodic and rare-earth oxides and methods of applying such a coating to a surface of a metallic substrate.

BACKGROUND

Controlling the wetting properties of surfaces has been the subject of scientific investigation. Most existing hydrophobic surfaces rely on low surface energy polymers, such as fluoroalkylsilane, or patterned roughness at low length scales. Both strategies have significant drawbacks. For example, fluorinated polymers lack resistance to abrasion and are easily degraded by ultraviolet light. Similarly, high roughness coatings are often fragile and poorly suited for harsh environments. In addition, these coatings often rely on complex manufacturing techniques that are not easily scalable.

Aircraft, automotive, and other transparency applications provide additional challenges. For these applications, a hydrophobic coating should maintain high hardness and resistance to attack by acids and bases. Moreover, these applications can involve metallic substrates, with thermal expansion coefficients and elastic moduli that are incompatible with many existing hydrophobic coatings.

It should be appreciated that there is a need for a scalable method of applying an improved hydrophobic coating having environmentally robust hydrophobicity. The coating should be robust to environmental degradation, mechanical abrasion, and repeated stress, while exhibiting inherently low surface energy without additional surface patterning. For applications involving metallic substrates, the coating should maintain hardness and resistance to attack by acids and bases, while also maintaining a permanent bond to the metallic surface as the surface thermally expands and contracts. The present invention fulfills these needs and provides further related advantages.

BRIEF SUMMARY OF THE INVENTION

The present invention is embodied in a method of applying a hydrophobic coating to a surface of a metallic substrate, as well as in the hydrophobic coating formed by the method. In one embodiment, the method includes anodizing a nanoporous layer of anodic metal oxide on the surface; applying a hydrophobic ceramic coating composition to the surface, after anodizing the surface, by an application method selected from the group consisting of: flowing, dipping, and spraying; and heating the coated surface at a cure temperature from about 150° C. to about 300° C. for at least 2 hours. In another embodiment, the method further includes the step of cathodizing yttrium oxide nanoparticles onto the before applying the hydrophobic ceramic coating composition to the surface. Each feature or concept is independent, but can be combined with any other feature of concept disclosed in this application.

In one embodiment, the method includes anodizing a nanoporous layer of anodic metal oxide on the surface, and cathodizing yttrium oxide nanoparticles onto the surface after anodizing the surface. In another embodiment, the method further includes the steps of applying a hydrophobic ceramic coating composition to the surface, after cathodizing the surface, by an application method selected from the group consisting of: flowing, dipping, and spraying; and heating the coated surface at a cure temperature from about 150° C. to about 300° C. for at least 2 hours. Each feature or concept is independent, but can be combined with any other feature of concept disclosed in this application.

In any one of the preceding embodiments, the method can further include the step of cleaning surface of the metallic substrate with acetone before the anodizing step. In another embodiment, the anodic metal oxide can comprises anodic aluminum oxide. Each feature or concept is independent, but can be combined with any other feature of concept disclosed in this application.

In any one of the preceding embodiments, the anodizing step can comprise anodizing the surface in an acidic solution having a concentration from about 0.1 M to about 0.3 M, at an anodizing voltage from about 8 V to about 12 V for an anodizing time from about 20 minutes to about 90 minutes. In one embodiment, the acidic solution can have a pH less than about 5. In another embodiment, the acidic solution can comprise an acid selected from the group consisting of: acetic acid, citric acid, hydrogen chloride, nitric acid, and sulfuric acid. In a further embodiment, the acid can comprise sulfuric acid. In an additional embodiment, the concentration can be about 0.2 M. In yet another embodiment, the anodizing voltage can be about 10 V. In one embodiment, the anodizing time can be from about 30 minutes to about 60 minutes. Each feature or concept is independent, but can be combined with any other feature of concept disclosed in this application.

In any one of the preceding embodiments involving cathodizing, the cathodizing step can comprise cathodizing the surface in a colloidal dispersion of yttrium oxide nanoparticles, at a cathodizing voltage from about 8 V to about 12 V, and a current from about 0.05 mA to about 0.15 mA, for a cathodizing time from about 30 minutes to about 90 minutes. In one embodiment, the yttrium oxide nanoparticles can have a mean particle size of about 10 nm and can be in an amount ranging from about 2% to about 10% by weight of the colloidal dispersion. In another embodiment, the amount of yttrium oxide nanoparticles can be about 5% by weight of the colloidal dispersion. In a further embodiment, the cathodizing voltage can be about 10 V and the current can be about 0.1 mA. In an additional embodiment, the cathodizing time can be about 60 minutes. In one embodiment, the method can further include the step of removing excess nanoparticles from the surface after cathodizing the surface. In another embodiment, the removing step can include wiping the surface with isopropanol. Each feature or concept is independent, but can be combined with any other feature of concept disclosed in this application.

In any one of the preceding embodiments involving applying a hydrophobic ceramic coating composition to the surface, the method can further include the step of drying the coating composition on the surface of the substrate for about 1 hour. In one embodiment, the method can include heating the coated surface at a cure temperature of about 200° C. In another embodiment, the hydrophobic ceramic coating composition can comprise a yttrium compound, a dispersion of yttrium oxide nanoparticles, a water-soluble polymer, and a solvent solution of de-ionized water and a water-soluble alcohol. In a further embodiment, the yttrium compound can comprise yttrium acetate, the dispersion of yttrium oxide nanoparticles can be in an amount ranging from about 0.5% to about 1% by weight of the coating composition, the water-soluble polymer can comprise polyvinyl alcohol in an amount from about 1% to about 5% by weight of the coating composition, the water-soluble alcohol can comprise isopropyl alcohol, and the de-ionized water and water-soluble alcohol can be present in the solvent solution in a ratio of about 2:1. Each feature or concept is independent, but can be combined with any other feature of concept disclosed in this application.

In any one of the preceding embodiments, the metallic substrate can comprises a metal selected from the group consisting of: aluminum, titanium, and stainless steel. In one embodiment, the metal can comprise aluminum. Each feature or concept is independent, but can be combined with any other feature of concept disclosed in this application.

The present invention is also embodied in a hydrophobic, coated substrate. In one embodiment, the substrate can include a metallic substrate having a surface, a nanoporous layer of anodic metal oxide formed on the surface, and a hydrophobic ceramic coating bonded to the nanoporous layer. In another embodiment, the substrate can further include yttrium oxide nanoparticles embedded in the nanoporous layer. Each feature or concept is independent, but can be combined with any other feature of concept disclosed in this application.

In one embodiment, the hydrophobic, coated substrate can include a metallic substrate having a surface, a nanoporous layer of anodic metal oxide formed on the surface, and yttrium oxide nanoparticles embedded in the nanoporous layer. In another embodiment, the substrate can further include a hydrophobic ceramic coating bonded to the nanoporous layer. Each feature or concept is independent, but can be combined with any other feature of concept disclosed in this application.

In any one of the preceding embodiments, the nanoporous layer of anodic metal oxide can include nanopipettes. In one embodiment, the nanopipettes can have an average diameter from about 10 nm to about 100 nm. In another embodiment, the nanopipettes can have an average diameter from about 20 nm to about 50 nm. In a further embodiment, the nanopipettes can have a minimum diameter of about 10 nm and a maximum diameter of about 100 nm. In one embodiment, the nanopipettes can have an average length from about 100 nm to about 10 μm. In another embodiment, the nanopipettes can have an average length from about 1.5 μm to about 8 μm. In a further embodiment, the nanopipettes can have a minimum length of about 100 nm and a maximum length of about 10 μm. Each feature or concept is independent, but can be combined with any other feature of concept disclosed in this application.

In one embodiment, the yttrium oxide nanoparticles can have a mean particle size of about 10 nm. In another embodiment, the yttrium oxide nanoparticles can be embedded in the nanopipettes. In a further embodiment, the hydrophobic ceramic coating can comprise yttrium acetate. Each feature or concept is independent, but can be combined with any other feature of concept disclosed in this application.

In any one of the preceding embodiments, the metallic substrate can comprise a metal selected from the group consisting of: aluminum, titanium, and stainless steel. In one embodiment, the metal can comprise aluminum. Each feature or concept is independent, but can be combined with any other feature of concept disclosed in this application.

In any one of the preceding embodiments, the anodic metal oxide can comprise anodic aluminum oxide. Each feature or concept is independent, but can be combined with any other feature of concept disclosed in this application.

Other features and advantages of the invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1A:
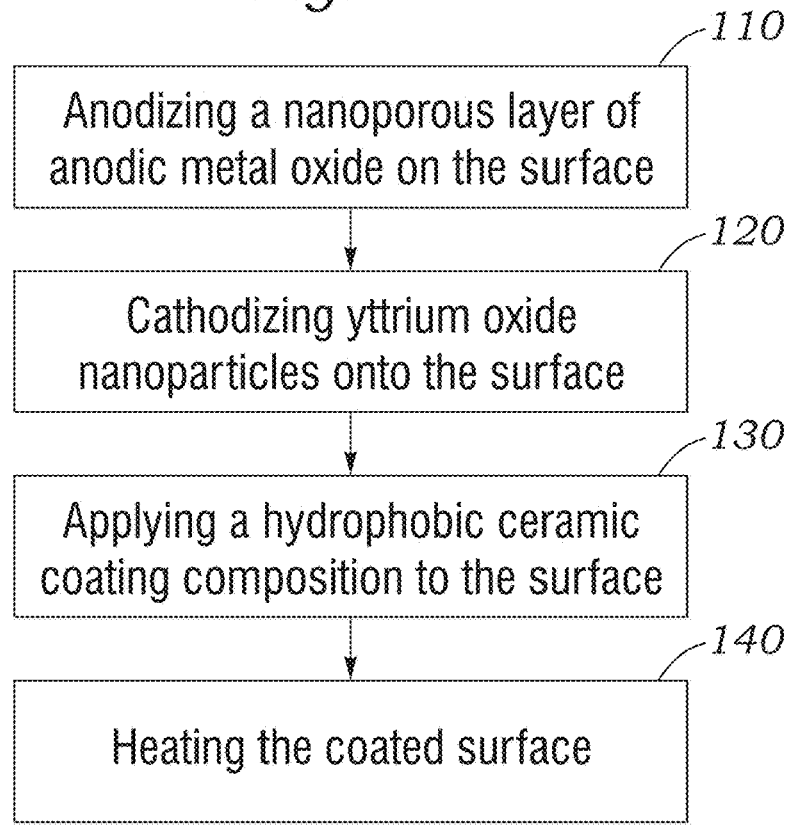
FIGS. 1A-1C are flow diagrams showing methods of applying a hydrophobic coating in accordance with some embodiments of the invention.
Figure 1B:
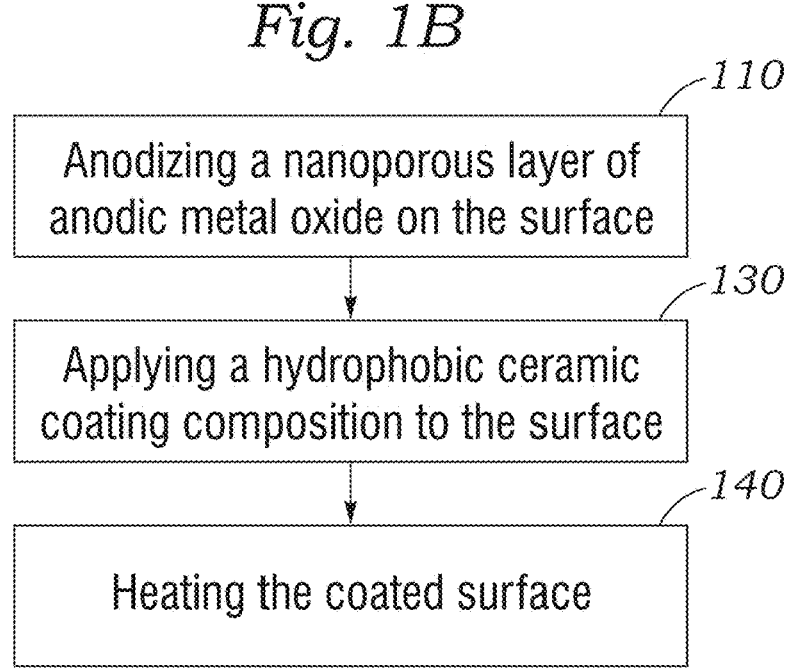
Figure 1C:
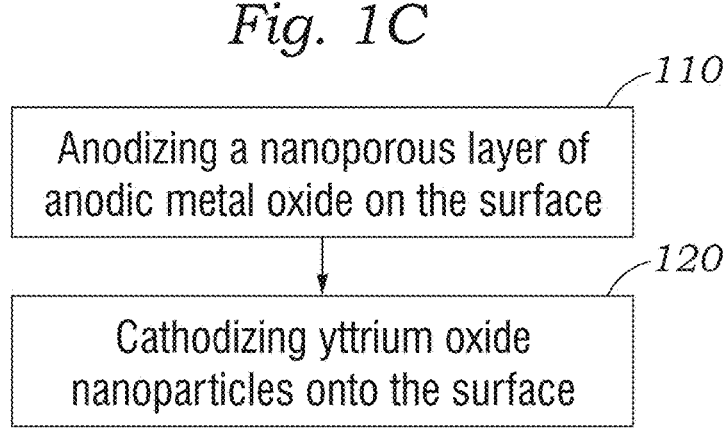

With reference now to FIGS. 1A-1C of the illustrative drawings, there is shown methods of applying a hydrophobic coating to a surface of a metallic substrate in accordance with embodiments of the invention. With particular reference to FIG. 1A, in one embodiment, the method can include a step 110 of anodizing a nanoporous layer of anodic metal oxide on the surface; a step 120 of cathodizing yttrium oxide nanoparticles onto the surface; a step 130 of applying a hydrophobic ceramic coating composition to the surface; and a step 140 of heating the coated surface.

In some embodiments, the method can omit one or more of these steps. For example, with reference now to FIG. 1B, in one embodiment, the method can include the step 110 of anodizing a nanoporous layer of anodic metal oxide on the surface, the step 130 of applying a hydrophobic ceramic coating to the surface, and the step 140 of heating the coated surface. Alternatively, with reference now to FIG. 1C, in another embodiment, the method can include the step 110 of anodizing a nanoporous layer of anodic metal oxide on the surface, and the step 120 of cathodizing yttrium oxide nanoparticles onto the surface.

The Metallic Substrate

In one embodiment, the metallic substrate can comprise a metal selected from the group consisting of: aluminum, titanium, and stainless steel. In another embodiment, the metal can comprise aluminum. These metallic substrates can present unique challenges for the design of durable hydrophobic coatings. For example, aluminum, titanium, and stainless steel have thermal expansion coefficients and elastic moduli that are incompatible with many hydrophobic, sol-gel coatings.

In addition, the self-passivating property of aluminum and titanium surfaces presents an added challenge. Metallic substrates such as aluminum and titanium are known to develop conformal oxide build-up on their surfaces. This oxide layer forms within minutes of atmospheric exposure and reaches thicknesses generally not exceeding 10 nm. The naturally-forming layer can be removed with light abrasion and mechanical deformation, making it difficult to maintain a surface coating with strong adhesion and durability.

Anodizing the Surface

Anodization is an electro-chemical process that changes the surface chemistry of a metal, via oxidation, to produce an anodic oxide layer. Surprisingly, the nanoporous layer of anodic metal oxide formed on the surface by step 110 can serve to create a permanent bond between sol gel coatings, such as a hydrophobic ceramic coating, and the surface of the metallic substrate. In one embodiment, the anodizing step 110 can comprise anodizing the surface in an acidic solution. In another embodiment, the acidic solution can have a pH less than about 5. In a further embodiment, the acidic solution can comprise an acid selected from the group consisting of: acetic acid, citric acid, hydrogen chloride, nitric acid, and sulfuric acid. In an additional embodiment, the acid can comprise sulfuric acid.

In one embodiment, the acidic solution can have a concentration from about 0.1 M to about 0.3 M. In another embodiment, the concentration can be about 0.2 M. In a further embodiment, the step 110 can be performed with an anodizing voltage from about 8 V to about 12 V for an anodizing time from about 20 minutes to about 90 minutes. In an additional embodiment, the anodizing voltage can be about 10 V. In yet another embodiment, the anodizing time can be from about 30 minutes to about 60 minutes.

Figure 2A:
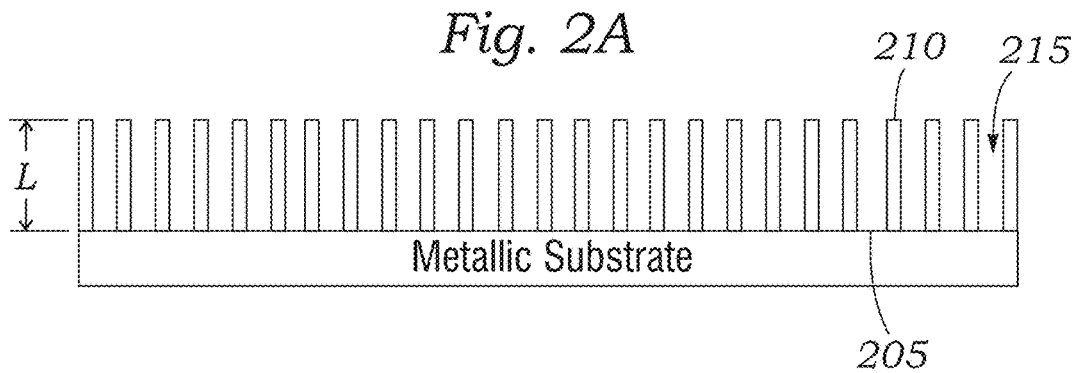
FIG. 2A is a cross-sectional illustration of a nanoporous layer of anodic metal oxide formed on the surface of a metallic substrate, in accordance with one embodiment of the invention.
Figure 2B:
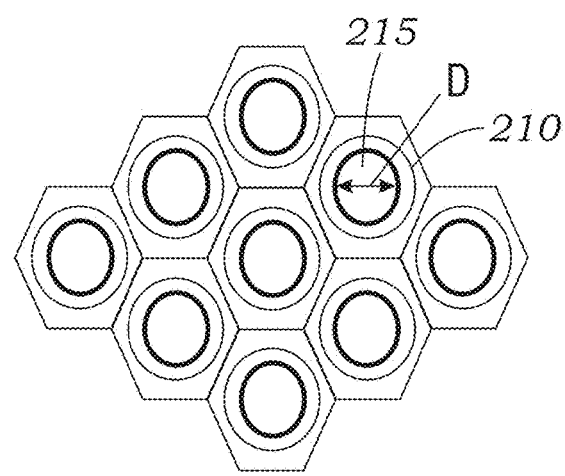
FIG. 2B is a top-view illustration of a nanoporous layer of anodic metal oxide formed on the surface of a metallic substrate, in accordance with one embodiment of the invention.

During the anodization step 110, self-assembled nanostructures of anodic metal oxide 210, such as anodic aluminum oxide, can be developed on the surface 205, as illustrated in FIGS. 2A and 2B. In one embodiment, the anodization parameters described above can produce a nanoporous layer of anodic metal oxide 210 having an ordered array of cylindrical pores, or nanopipettes 215. The pore diameters D, periodicity, and density distribution of the nanopipettes 215 can be controlled by adjusting the anodization parameters described above. Adjustments to the anodization parameters can be made to control both the diameter D and length L of the nanopipettes 215, independently.

In one embodiment, the nanopipettes 215 can have an average diameter D from about 10 nm to about 100 nm. In another embodiment, the nanopipettes 215 can have an average diameter D from about 20 nm to about 50 nm. In a further embodiment, the nanopipettes 215 can have a minimum diameter D of about 10 nm and a maximum diameter of about 100 nm.

In one embodiment, the nanopipettes 215 can have a minimum diameter D of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm. In another embodiment, the nanopipettes 215 can have a maximum diameter D of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm.

In one embodiment, the nanopipettes 215 can have an average length L from about 100 nm to about 10 µm. In another embodiment, the nanopipettes 215 can have an average length L from about 1.5 µm to about 8 µm. In a further embodiment, the nanopipettes 215 can have a minimum length L of about 100 nm and a maximum length L of about 10 µm.

In one embodiment, the nanopipettes 215 can have a minimum length L of about 100 nm, about 500 nm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm. In another embodiment, the nanopipettes 215 can have a maximum length L of about 100 nm, about 500 nm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm.

Figure 3A:
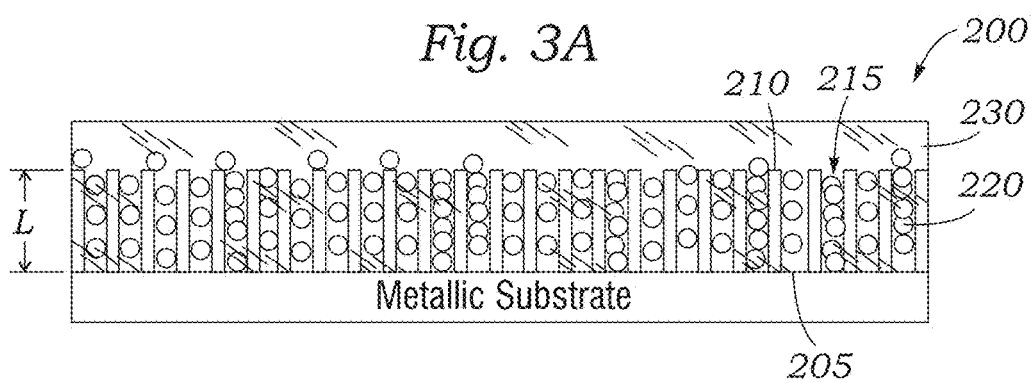
FIG. 3A is a cross-sectional illustration of a hydrophobic, coated substrate, in accordance with one embodiment of the invention.

This nanoporous layer of anodic metal oxide 210 can enhance material interpenetration and increase the strength of the mechanical and chemical bond between the surface 205 and, for example, embedded yttrium oxide nanoparticles 220 (FIG. 3C) a hydrophobic ceramic coating 230 (FIG. 3B), or both (FIG. 3A).

Cathodizing the Surface

With reference again to FIGS. 1A and 1C, in one embodiment, the cathodizing step 120 can comprise cathodizing the surface in a colloidal dispersion of yttrium oxide nanoparticles. In another embodiment, the yttrium oxide nanoparticles can have a mean particle size of about 10 nm and can be in an amount ranging from about 2% to about 10% by weight of the colloidal dispersion. In a further embodiment, the amount of yttrium oxide nanoparticles can be about 5% by weight of the colloidal dispersion.

In one embodiment, the cathodizing step 120 comprises electrically connecting the metallic substrate to the negative (cathodic) terminal in an electrodeposition assembly (not shown). In another embodiment, the surface of the metallic substrate is cathodized with a cathodizing voltage from about 8 V to about 12 V, and a current from about 0.05 mA to about 0.15 mA, for a time from about 30 minutes to about 90 minutes. In a further embodiment, the cathodizing voltage can be about 10 V and the current can be about 0.1 mA. In an additional embodiment, the cathodizing time can be about 60 minutes. In yet another embodiment, the cathodizing step 120 can further include the step of removing excess nanoparticles from the surface after it has been cathodized. In one embodiment, the removing step can include wiping the cathodized surface with isopropanol.

Figure 3B:
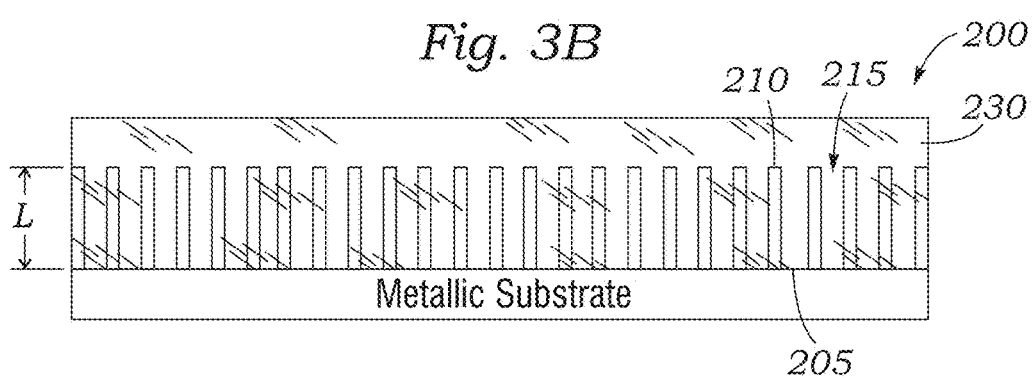
FIG. 3B is a cross-sectional illustration of a hydrophobic, coated substrate, in accordance with one embodiment of the invention.
Figure 3C:
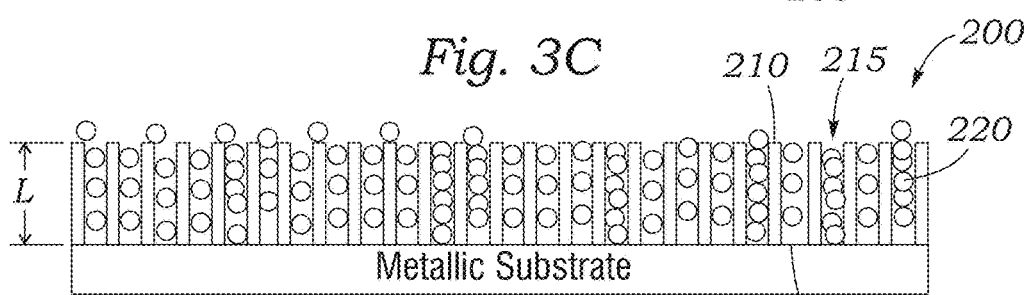
FIG. 3C is a cross-sectional illustration of a hydrophobic, coated substrate, in accordance with one embodiment of the invention.

Under these cathodizing conditions, embodiments of this method can result in a hydrophobic, coated substrate 200 as illustrated in FIG. 3C. In one embodiment, the hydrophobic, coated substrate 200 can include the metallic substrate having the surface 205, the nanoporous layer of anodic metal oxide 210 formed on the surface 205, and yttrium oxide nanoparticles 220 embedded in the nanoporous layer 210. In an additional embodiment, the yttrium oxide nanoparticles 220 can have a mean particle size of about 10 nm. In yet another embodiment, the yttrium oxide nanoparticles 220 can be embedded in the nanopipettes 215.

These embedded yttrium oxide nanoparticles 220 can improve the hydrophobicity of the surface 205 while also providing robust performance against surface abrasion and deformation. In addition, when they are used in combination with a ceramic coating (FIG. 3A), such as the ceramic coating discussed below, the nanoparticles 220 can allow the ceramic coating to cure at a lower temperature, which mitigates atomic migration and other changes to the mechanical properties of the metallic substrate.

Applying a Ceramic Coating

With reference again to FIGS. 1A and 1B, the coating composition can be applied to the surface, in step 130, by an application method selected from the group consisting of flowing, dipping, and spraying. The selection of the appropriate method, or combination of methods, is commonly understood by one of ordinary skill in the art. For example, a flow or spray coating may be appropriate for large parts or complex shapes, or when two different coatings are required. Dip coating may be appropriate, for example, where an entire part is to be coated.

In one embodiment, the coating composition can include a yttrium compound; an additive selected from the group consisting of a cerium compound and a dispersion of yttrium oxide nanoparticles; a water-soluble polymer; and a solvent solution of de-ionized water and a water-soluble alcohol.

The table below provides chemical formulas for the yttrium-based chemical reagents available for sol-gel synthesis. In one embodiment, the yttrium is selected from the group consisting of yttrium acetate, yttrium carbonate, yttrium chloride, yttrium fluoride, yttrium hydroxide, yttrium metal, yttrium nitrate, yttrium oxalate, and yttrium sulfate. In a preferred embodiment, the yttrium is yttrium acetate.

| Yttrium Compound | Formula |
| --- | --- |
| Yttrium Acetate | $Y(C_2H_3O_2)_3 \cdot H_2O$ |
| Yttrium Carbonate | $Y_2(CO_3)_3 \cdot H_2O$ |
| Yttrium Chloride | $YCl_3 \cdot (H_2O)_6$ |
| Yttrium Fluoride | $YF_3$ |
| Yttrium Hydroxide | $Y(OH)_3 \cdot H_2O$ |
| Yttrium Metal | $Y$ |
| Yttrium Nitrate | $Y(NO_3)_3 \cdot H_2O$ |
| Yttrium Oxalate | $Y_2(C_2O_4)_3 \cdot H_2O$ |
| Yttrium Sulfate | $Y_2(SO_4)_3 \cdot (H_2O)_8$ |

In one embodiment, the cerium compound is water-soluble. Examples of water-soluble cerium compounds include cerium bromide, cerium chloride, and cerium nitrate. In another embodiment, the cerium compound is sparingly water-soluble. Examples of sparingly water-soluble cerium compounds include cerium acetate and cerium sulfate.

In other embodiments, the coating composition comprises an additive of a dispersion of yttrium oxide nanoparticles. The dispersion of yttrium oxide nanoparticles is preferably compatible with the coating composition and can therefore be added at high levels without precipitation. In one embodiment, the dispersion of yttrium oxide nanoparticles is in an amount ranging from about 0.1% to about 5% by weight of the coating composition. In a preferred embodiment, the amount of the dispersion of yttrium oxide nanoparticles is from about 0.5% to about 1% by weight of the coating composition.

A preferred embodiment of the coating composition further comprises a water-soluble polymer. This water-soluble polymer component acts to increase the thickness of the final hydrophobic coating. The hydrophobic nature of the coating composition without the water-soluble polymer makes it resistant to generating high thickness. The addition of a water-soluble polymer to the coating composition increases the final coating thickness to over about 50 nm, over about 75 nm, over about 100 nm, over about 125 nm, over about 150 nm, over about 200 nm, over about 225 nm, or over about 250 nm.

In one embodiment, the water-soluble polymer is selected from the group consisting of poly(n-vinylpyrrolidone), poly(vinylamine) hydrochloride, polymethacrylamide, polyvinyl alcohol, polyacrylamide, poly(ethylene oxide-b-propylene oxide), poly(methacrylic acid), poly(ethylene oxide), poly(n-iso-propylacrylamide), and poly(2-vinylpyridine). In a further embodiment, the water-soluble polymer is polyvinyl alcohol. In one embodiment, the water-soluble polymer is in an amount ranging from about 1% to about 10% by weight of the coating composition. In yet another embodiment, the amount of the water-soluble polymer is from about 1% to about 5% by weight of the coating composition.

A preferred embodiment of the coating composition further comprises a solvent solution of de-ionized water and a water-soluble alcohol. In one embodiment, the water-soluble alcohol is selected from the group consisting of isopropyl alcohol, methanol, ethanol, propanol, and butanol. The table below provides the chemical formulas and the water solubility levels of some water-soluble alcohols, but any other water-soluble alcohol may be used. In another preferred embodiment, the de-ionized water and water-soluble alcohol are present in the solvent solution in a ratio of about 2:1.

| Compound | Formula | Solubility In Water |
| --- | --- | --- |
| Isopropyl Alcohol | $C_3H_8O$ | Miscible |
| Methanol | $CH_3OH$ | Miscible |
| Ethanol | $CH_3CH_2OH$ | Miscible |
| Propanol | $CH_3(CH_2)_2OH$ | Miscible |
| Butanol | $CH_3(CH_2)_3OH$ | 9 g/100 mL |

In one embodiment, not shown, the method includes the step of allowing the coating composition on the surface of the substrate to dry before the heating step 140. In an alternative embodiment, the method can comprise the step of drying the coating composition on the surface of the substrate before heating 140. In either case, the coating composition can be allowed to dry for about 1 hour, about 2 hours, about 3 hours, or until the coating composition is in the "green state."

Heating the Surface

With reference again to FIGS. 1A and 1B, in one embodiment, the method can comprise the step 140 of heating the coated surface at a cure temperature from about 150° C. to about 300° C. for a cure time of at least 2 hours. In another embodiment, the cure time can be from about 2 hours to about 24 hours. In a further embodiment, the cure temperature can be about 200° C. and the cure time can be at least 2 hours.

A Hydrophobic, Coated Substrate

With reference again to FIGS. 3A-3C of the illustrative drawings, there is shown hydrophobic, coated substrates 200 in accordance with embodiments of the invention. With particular reference to FIG. 3A, in one embodiment, the substrate can include a metallic substrate having a surface 205, a nanoporous layer of anodic metal oxide 210 formed on the surface 205, yttrium oxide nanoparticles 220 embedded in the nanoporous layer 210, and a hydrophobic ceramic coating 230 bonded to the nanoporous layer 210. The hydrophobic, coated substrate 200 depicted in FIG. 3A can be made by the method outlined in FIG. 1A.

In some embodiments, the hydrophobic, coated substrate 200 can omit one or more of these elements. For example, with reference now to FIG. 3B, in one embodiment, the hydrophobic, coated substrate 200 can include the metallic substrate having the surface 205, the nanoporous layer of anodic metal oxide 210 formed on the surface 205, and the hydrophobic ceramic coating 230 bonded to the nanoporous layer 210. This hydrophobic, coated substrate 200 can be made by the method outlined in FIG. 1B. Alternatively, with reference to FIG. 3C, in another embodiment, the hydrophobic, coated substrate 200 can include the metallic substrate having the surface 205, the nanoporous layer of anodic metal oxide 210 formed on the surface 205, and the yttrium oxide nanoparticles 220 embedded in the nanoporous layer 210. This hydrophobic, coated substrate 200 can be made by the method outlined in FIG. 1C.

In one embodiment, the nanoporous layer of anodic metal oxide 210 can include nanopipettes 215. In another embodiment, the nanopipettes 215 can have an average diameter D from about 10 nm to about 100 nm. In a further embodiment, the nanopipettes 215 can have an average diameter D from about 20 nm to about 50 nm. In an additional embodiment, the nanopipettes 215 can have a minimum diameter D of about 10 nm and a maximum diameter D of about 100 nm.

In one embodiment, the nanopipettes 215 can have a minimum diameter D of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm. In another embodiment, the nanopipettes 215 can have a maximum diameter D of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm.

In one embodiment, the nanopipettes 215 can have an average length L from about 100 nm to about 10 μm. In another embodiment, the nanopipettes 215 can have an average length L of about 1.5 μm to about 8 μm. In a further embodiment, the nanopipettes 215 can have a minimum length L of about 100 nm and a maximum length L of about 10 μm.

In one embodiment, the nanopipettes 215 can have a minimum length L of about 100 nm, about 500 nm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, or about 10 μm. In another embodiment, the nanopipettes 215 can have a maximum length L of about 100 nm, about 500 nm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, or about 10 μm.

In one embodiment, the yttrium oxide nanoparticles 220 can have a mean particle size of about 10 nm. In an additional embodiment, the yttrium oxide nanoparticles 220 can be embedded in the nanopipettes 215. In yet another embodiment, the hydrophobic ceramic coating 230 can comprise yttrium acetate.

These embedded yttrium oxide nanoparticles 220 can improve the hydrophobicity of the surface 205 while also providing robust performance against surface abrasion and deformation. In addition, when they are used with the ceramic coating 230, the nanoparticles 220 can allow the ceramic coating 230 to cure at a lower temperature, which mitigates atomic migration and other changes to the mechanical properties of the metallic substrate.

In some embodiments, the resulting hydrophobic, coated substrate 200 will exhibit water-contact angles greater than about 90°, greater than about 95°, greater than about 100°, or greater than about 105°. The hydrophobic coating will have a thickness of over about 50 nm, over about 75 nm, over about 100 nm, over about 125 nm, over about 150 nm, over about 200 nm, over about 225 nm, or over about 250 nm. In addition, the hydrophobic coating will be robust to environmental degradation, mechanical abrasion, and repeated stress. For example, in some embodiments, the hydrophobic coating will exhibit high hardness and resistance to attack by acids and bases.

It should be appreciated from the foregoing description that the present invention provides a scalable method of applying a hydrophobic coating that exhibits environmentally robust hydrophobicity. Coatings produced by these methods are hydrophobic and resistant to environmental degradation, mechanical abrasion, repeated stress, and attack by acids and bases. In addition, the coatings are thick enough for robust performance and the cure temperature is low enough to mitigate atomic migration and other changes to the mechanical properties of the metallic substrate. For all of these reasons, the methods described in this application, and the resulting coatings, are ideal for aircraft and automotive transparency applications.

Specific methods, devices, and materials are described, although any methods and materials similar or equivalent to those described can be used in the practice or testing of the present invention. Unless defined otherwise, all technical and scientific terms used in this application have the same meanings as commonly understood by one of ordinary skill in the art to which this invention belongs.

As used in this application, singular words such as "a" and "an" mean "one or more" unless clear intent is shown to limit the element to "one." The term "about" means±2% of the value it modifies.

As used in this application, the term "hydrophobic" means lacking an affinity for water, and a surface considered hydrophobic when the water contact angle is at least about 80 degrees.

As used in this application, the term "water-soluble" means the compound is infinitely soluble in water, very soluble in water, freely soluble in water, or soluble in water, as these terms are commonly understood. A material is generally considered "very soluble" if about 1 gram of material requires about 1 milliliter or less of solute to dissolve. A material is generally considered "freely soluble" if about 1 gram of material requires about 1 milliliter to about 10 milliliters of solute to dissolve. A material is generally considered "soluble" if about 1 gram of material requires about 10 milliliters to 30 milliliters of solute to dissolve. A material is generally considered "sparingly soluble" if about 1 gram of material requires about 30 milliliters to about 100 milliliters of solute to dissolve.

Without further elaboration, it is believed that one skilled in the art, using the proceeding description, can make and use the present invention to the fullest extent. Other objectives, features, and advantages of the present embodiments will become apparent from the following specific examples. The specific examples, while indicating specific embodiments, are provided by way of illustration only. Accordingly, the present invention also includes those various changes and modifications within the spirit and scope of the invention that may become apparent to those skilled in the art from this detailed description. The following examples are illustrative only, and are not limiting of the disclosure in any way whatsoever.

EXAMPLE 1

Figure 4:
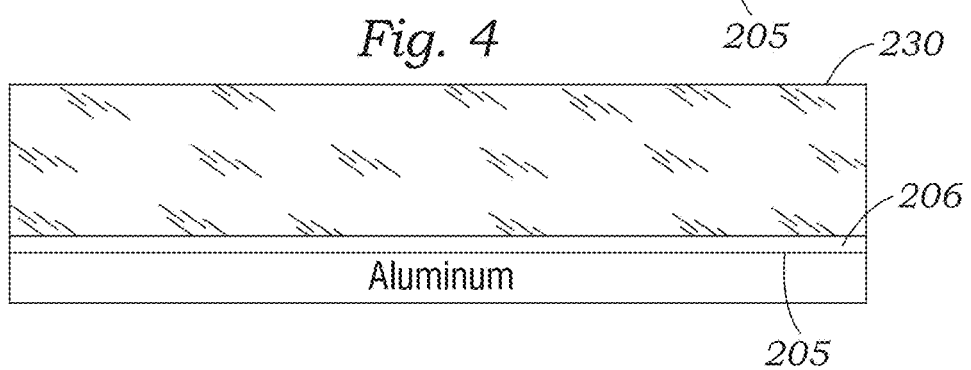
FIG. 4 is a cross-sectional illustration of a hydrophobic ceramic coating applied to an aluminum substrate having a native aluminum oxide layer.

A first sample series was prepared using aluminum coupons, which had been cleaned with acetone. A ceramic coating was applied to the aluminum substrates by flow or spray coating. The ceramic coating composition (for this and all subsequent samples) included a yttrium compound, a dispersion of yttrium oxide nanoparticles, a water-soluble polymer, and a solvent solution of de-ionized water and a water-soluble alcohol. The coated substrate was thermally treated at about 300° C. for about 2 hours in ambient atmosphere. An illustration of the first sample series is shown in FIG. 4, which depicts the ceramic coating 230 on a native aluminum oxide layer 206 formed on the surface 205 of the aluminum substrate.

A second sample series was prepared using aluminum coupons, which had been cleaned with acetone. The second sample series was subjected to an anodization process in an acidic solution of 0.2 M sulfuric acid. For this process, the aluminum coupons were attached to the anode and a constant voltage of 10 V was applied for about 30 minutes. Under these anodization conditions, a nanoporous layer of anodized aluminum oxide was developed on the aluminum surface. The nanoporous structure included nanopipettes having an average diameter from about 20 nm and an average length of about 1.5 µm.

A third sample series was prepared under the same conditions as the second sample series, except the voltage was applied for about 5 hours. Under these anodization conditions, a nanoporous layer of anodized aluminum oxide was developed on the aluminum surface, and the structure included nanopipettes having an average diameter from about 20 nm and an average length of about 8 µm.

A fourth sample series was prepared under the same conditions as the second sample series, except the acidic solution comprised 0.2 M hydrochloric acid. Under these anodization conditions, a nanoporous layer of anodized aluminum oxide was developed on the aluminum surface, and the structure included nanopipettes having an average diameter from about 50 nm and an average length of about 500 nm.

Figure 5:
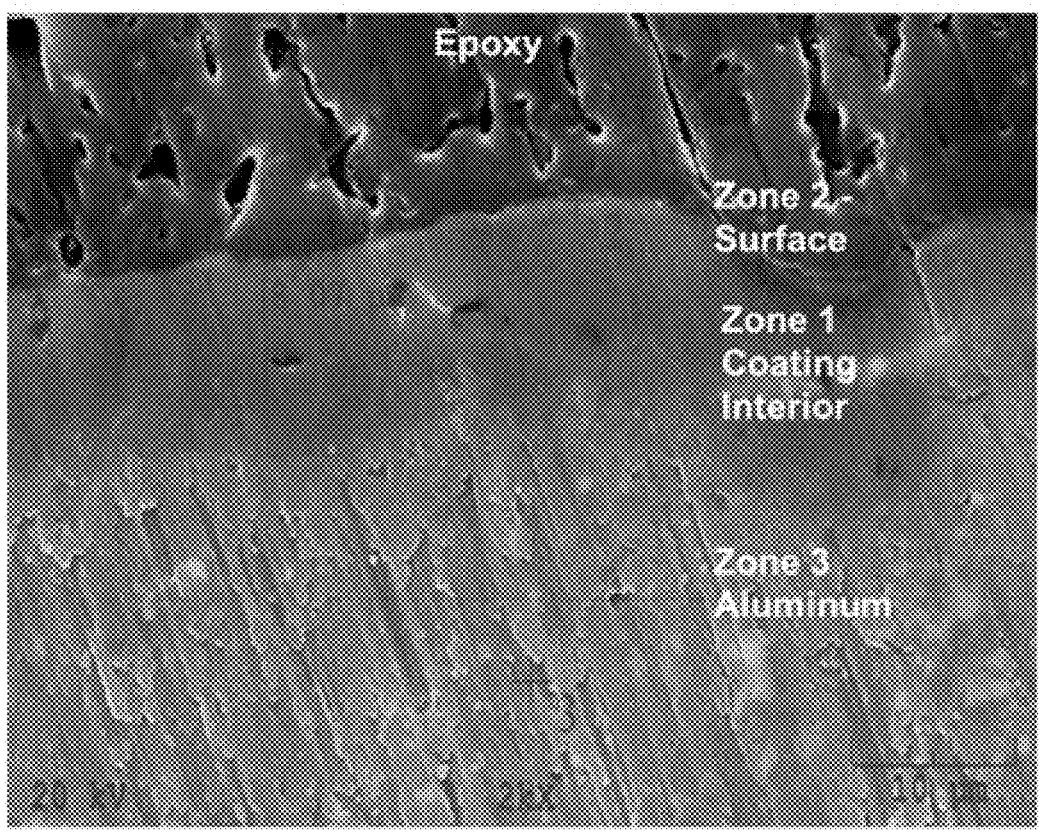
FIG. 5 is a scanning electron micrograph of an anodized aluminum oxide nanopipette layer, in accordance with one embodiment of the invention.

The resulting anodized layers (for the second, third, and fourth samples) exhibited a low water contact angle, which is consistent with aluminum oxide. The layers were abrasion resistant, as measured by steel wool hand abrasion tests. As shown in FIG. 5, cross-sectional scanning electron microscopy, reveals an extremely fine structure. The anodized layer (zone 1) comprises high aspect-ratio aluminum oxide crystalline grains, which are oriented perpendicular to the substrate, and which have an average diameter of about 20 nm and an average length of about 8 µm.

Next, the ceramic coating was applied to the aluminum substrates, in the second sample series, by flow or spray coating, and the coated substrates were thermally treated at about 300° C. for about 2 hours in ambient atmosphere. An illustration of the second sample series is shown in FIG. 3B, which depicts the nanoporous layer of anodic metal oxide 210 formed on the surface 205, and the hydrophobic ceramic coating 230 bonded to the nanoporous layer 210.

The first sample series, which was coated on the native aluminum surface, was compared to the anodized aluminum oxide buffered coatings from the second sample series. The table below illustrates the results. As is shown, the hydrophobic ceramic coatings applied directly to the native aluminum surface displayed variable quality in surface finish and hydrophobicity. In addition, the ceramic coatings that were applied without the anodized layer were easily removed with hand pressure. In contrast, the second sample series had a smooth, hydrophobic surface and exhibited significant abrasion resistance.

| Sample Series | Appearance | Water Contact Angle | Durability (Steel wool with hand pressure) |
| --- | --- | --- | --- |
| First (Hydrophobic Ceramic Coating without AAO) | Splotchy, incomplete surface coverage | <40° | Poor |
| Second (Hydrophobic Ceramic Coating with AAO) | Good | 90° | Good |

EXAMPLE 2

For a fifth sample series, aluminum coupons were cleaned according to previous examples, followed by anodization in 0.2 M sulfuric acid, at about 10 V for about 1 hour. After the anodization process, the coupons were cleaned in deionized water. Illustrations of the anodized surface are shown in FIGS. 2A and 2B.

For a sixth sample series, the following steps were added after anodization. First, an aqueous yttrium oxide colloidal solution with a mean particle size of 10 nm and a solids loading of 5% was prepared. The anodized aluminum coupons were then electrically connected to the negative (cathodic) terminal in the electrodeposition assembly. This configuration was selected due to the natural positive surface charge of yttrium oxide in acidic aqueous solution. A voltage of about 10 V and a current of about 0.1 mA was maintained for about 1 hour. A buildup of excess nanoparticles became visible on the anodized surface. This buildup was removed by wiping the surface with isopropanol, leaving a smooth anodized surface. Yttrium oxide nanoparticles were embedded in the anodized surface as illustrated in FIG. 3C.

The fifth and sixth series were compared and the table below illustrates the results. As is shown, initial testing of the nanoparticle-enhanced coatings indicated significant abrasion resistance. The surfaces were hydrophobic, with water contact angles measuring between about 80° and about 90°, which is a reduction from that of the hydrophobic ceramic coating from the second sample series. This is presumably due to incomplete coverage of the surface with yttrium oxide. The coated coupons showed extremely robust performance against surface abrasion and deformation, sustaining greater than 5% deformation with no reduction in water contact angle.

| Sample Series | Appearance | Water Contact Angle | Durability (Steel wool with hand pressure) |
| --- | --- | --- | --- |
| Fifth (AAO without Yttrium Oxide Nanoparticles) | Good | <20° | Very Good |

-continued

| Sample Series | Appearance | Water Contact Angle | Durability (Steel wool with hand pressure) |
|---|---|---|---|
| Sixth (AAO with Yttrium Oxide Nanoparticles) | Good | 80°-90° | Very Good |

EXAMPLE 3

For a seventh sample series, aluminum coupons were cleaned, anodized, and coated with the ceramic coating according to the process outlined for the second sample series. The ceramic coating was cured at about 300° C.

For an eighth sample series, aluminum coupons were prepared in an identical configuration to the seventh sample series, but with a reduced 200° C. cure.

Figure 6:
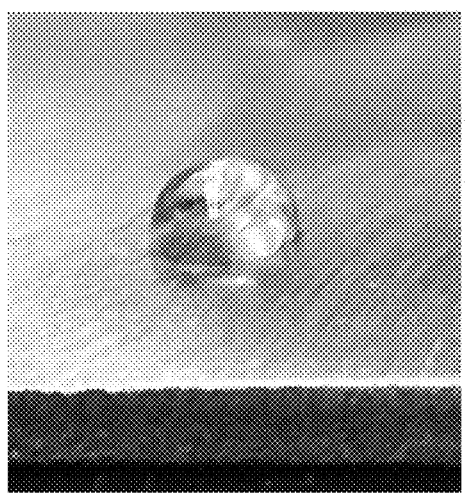
FIG. 6 is a photograph of a water droplet on an aluminum surface having a yttrium-oxide-nanoparticle-enhanced hydrophobic, ceramic coating, in accordance with one embodiment of the invention.

For a ninth sample series, aluminum coupons were prepared in an identical configuration to the eight sample series. However, before the hydrophobic ceramic coating was applied, the anodized coupons were cathodized in a colloidal dispersion of yttrium oxide nanoparticles, as described above in connection with the sixth sample series. An illustration of the ninth sample series is shown in FIG. 3A, which depicts the nanoporous layer of anodic metal oxide 210 formed on the surface 205, the yttrium oxide nanoparticles 220 embedded in the nanoporous layer 210, and the hydrophobic ceramic coating 230 bonded to the nanoporous layer 210. With reference to FIG. 6, the ninth sample series exhibited a water contact angle greater than or equal to about 90°.

The seventh, eighth, and ninth series were compared and the table below illustrates the results. As is shown, the nanoparticle-enhanced ninth sample series displayed improved cosmetic quality and higher water contact angles compared to the version without the yttrium oxide nanoparticles (eight series) cured at the same temperature. The data show high concentrations of yttrium oxide nanoparticles in the anodic aluminum oxide pores causes enhanced nucleation under the surface and crystallization temperature suppression. The seventh and ninth sample series had smooth, high quality coatings, which exhibited robust hydrophobicity. Therefore, the nanoparticle-embedded anodic aluminum oxide buffer layer allows for a lower temperature cure to achieve similar desirable properties, The lower cure temperature mitigates atomic migration and other changes to the mechanical properties of the metallic substrate.

| Sample Series | Appearance | Water Contact Angle | Cure Temperature |
|---|---|---|---|
| Seventh (AAO/Hydrophobic Ceramic w/o Yttrium Oxide Nanoparticles | Good | ≥90° | 300° C. |
| Eighth (AAO/Hydrophobic Ceramic w/Yttrium Oxide Nanoparticles) | Okay | 70°-90° | 200° C. |
| Ninth (AAO/Hydrophobic Ceramic w/Yttrium Oxide Nanoparticles) | Good | ≥90° | 200° C. |

The invention has been described in detail with reference only to the presently preferred embodiments. Persons skilled in the art will appreciate that various modifications can be made without departing from the invention. Accordingly, the invention is defined only by the following claims.

The invention claimed is:

1. A method of applying a hydrophobic coating to a surface of a metallic substrate, the method comprising:
   anodizing a nanoporous layer of anodic metal oxide on the surface;
   applying a hydrophobic ceramic coating composition to the surface, after anodizing the surface, by an application method selected from the group consisting of flowing, dipping, and spraying; and
   heating the coated surface at a cure temperature from about 150° C. to about 300° C. for at least 2 hours;
   wherein the hydrophobic ceramic coating composition comprises a yttrium compound and a dispersion of yttrium oxide nanoparticles.

2. The method of claim 1, wherein the metallic substrate comprises a metal selected from the group consisting of: aluminum, titanium, and stainless steel.

3. The method of claim 2, wherein the metal comprises aluminum.

4. The method of claim 3, wherein the anodic metal oxide comprises anodic aluminum oxide.

5. The method of claim 1, wherein the anodizing comprises anodizing the surface in an acidic solution having a concentration from about 0.1 M to about 0.3 M, at an anodizing voltage from about 8 V to about 12 V for an anodizing time from about 20 minutes to about 90 minutes.

6. The method of claim 5, wherein the acidic solution comprises an acid selected from the group consisting of: acetic acid, citric acid, hydrogen chloride, nitric acid, and sulfuric acid.

7. The method of claim 1, wherein the hydrophobic ceramic coating composition further comprises:
   a water-soluble polymer; and
   a solvent solution of de-ionized water and a water-soluble alcohol.

8. The method of claim 1, further comprising the step of cathodizing yttrium oxide nanoparticles onto the surface before applying the hydrophobic ceramic coating composition to the surface.

9. The method of claim 8, wherein the cure temperature is about 200° C.

10. The method of claim 8, wherein the cathodizing comprises cathodizing the surface in a colloidal dispersion of yttrium oxide nanoparticles, at a cathodizing voltage from about 8 V to about 12 V, and a current from about 0.05 mA to about 0.15 mA, for a cathodizing time from about 30 minutes to about 90 minutes.

11. The method of claim 10, wherein the yttrium oxide nanoparticles have a mean particle size of about 10 nm and are in an amount ranging from about 2% to about 10% by weight of the colloidal dispersion.

12. A method of applying a hydrophobic coating to a surface of a metallic substrate, the method comprising:
   anodizing a nanoporous layer of anodic metal oxide on the surface;
   cathodizing yttrium oxide nanoparticles onto the anodized surface;
   applying a hydrophobic ceramic coating composition to the cathodized surface by an application method selected from the group consisting of: flowing, dipping, and spraying; and
   heating the coated surface at a cure temperature of about 2000 C for at least 2 hours;

wherein the anodizing comprises anodizing the surface in an acidic solution having a concentration of about 0.2 M, at an anodizing voltage of about 10 V for an anodizing time from about 30 minutes to about 60 minutes;

wherein the cathodizing comprises cathodizing the surface in a colloidal dispersion of yttrium oxide nanoparticles, at a cathodizing voltage of about 10 V, and a current of about 0.1 mA, for a cathodizing time of about 60 minutes; and wherein the hydrophobic ceramic coating composition comprises a yttrium compound and a dispersion of yttrium oxide nanoparticles.

13. The method of claim 12, wherein the metal comprises aluminum and the anodic metal oxide comprises anodic aluminum oxide.

14. The method of claim 13, wherein the acid comprises sulfuric acid.

15. The method of claim 14, wherein the yttrium oxide nanoparticles have a mean particle size of about 10 nm and are in an amount of about 5% by weight of the colloidal dispersion.

16. The method of claim 15, wherein the hydrophobic ceramic coating composition further comprises:

polyvinyl alcohol in an amount from about 1% to about 5% by weight of the coating composition; and a solvent solution of de-ionized water and isopropyl alcohol in a ratio of about 2:1;

wherein the yttrium compound comprises yttrium acetate; and wherein the dispersion of yttrium oxide nanoparticles is in an amount ranging from about 0.5% to about 1% by weight of the coating composition.

* * * * *